United States Patent [19]

Schieler

[11] Patent Number: 4,671,121
[45] Date of Patent: Jun. 9, 1987

[54] LIQUID LEVEL INDICATING DEVICE

[75] Inventor: Leroy Schieler, Auburn, Calif.

[73] Assignee: BankAmerica Corporation, San Francisco, Calif.

[21] Appl. No.: 795,658

[22] Filed: Nov. 6, 1985

[51] Int. Cl.⁴ ............................................. G01F 23/36
[52] U.S. Cl. ...................................... 73/317; 73/313; 340/625
[58] Field of Search ................ 73/313, 317, 318, 308; 340/623, 625; 338/33; 4/393, 399, 401; 137/426, 434

[56] References Cited

U.S. PATENT DOCUMENTS

| | | | |
|---|---|---|---|
| 1,162,686 | 11/1915 | Dodokin | 73/318 |
| 1,355,939 | 10/1920 | Cole et al. | 73/318 |
| 1,548,859 | 8/1925 | Valerius | 137/410 |
| 1,922,362 | 8/1933 | Halversen | 73/317 |
| 2,508,290 | 5/1960 | Poetsch | 338/33 |
| 2,728,226 | 12/1955 | Vanderberg et al. | 73/317 |
| 2,816,973 | 12/1957 | Bezk et al. | 340/625 |
| 2,906,122 | 9/1959 | Smith et al. | 73/313 |
| 2,923,156 | 2/1960 | Young | 73/313 |
| 3,038,491 | 6/1962 | Beazley | 137/426 |
| 3,200,646 | 8/1965 | Donko et al. | 73/313 |
| 4,107,998 | 8/1978 | Taylor | 73/313 |
| 4,144,757 | 3/1979 | Mauboussin | 73/308 |
| 4,178,802 | 12/1979 | Yamamoto | 73/313 |
| 4,184,370 | 1/1980 | Schlick et al. | 73/313 |
| 4,194,396 | 3/1980 | Ohsawa et al. | 73/313 |
| 4,220,047 | 9/1980 | Mauboussin | 73/313 |
| 4,557,144 | 12/1985 | Lucchini | 73/313 |

*Primary Examiner*—Charles Frankfort
*Assistant Examiner*—Thomas B. Will
*Attorney, Agent, or Firm*—Flehr, Hohbach, Test, Albritton and Herbert

[57] ABSTRACT

A liquid level indicating device for a fuel tank adaptable for use in any size fuel tank comprising a mounting plate, a support arm depending therefrom, a float arm, a float, a linear wire-wound resistor, a sliding contact member, a device for varying the angle of tilt of the float arm, a device for varying the distance of the arc through which the float sweeps relative to the support arm, and a device for adjusting the effective resistance range of said resistor by controlling the length of travel of the sliding contact member along the linear wire-wound resistor.

11 Claims, 7 Drawing Figures

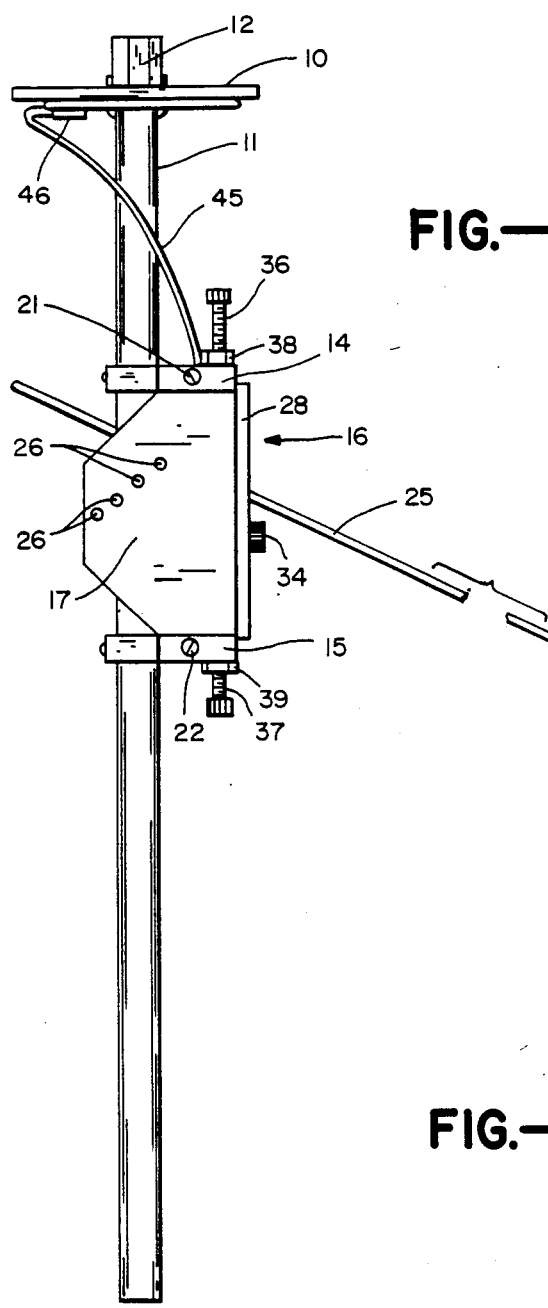
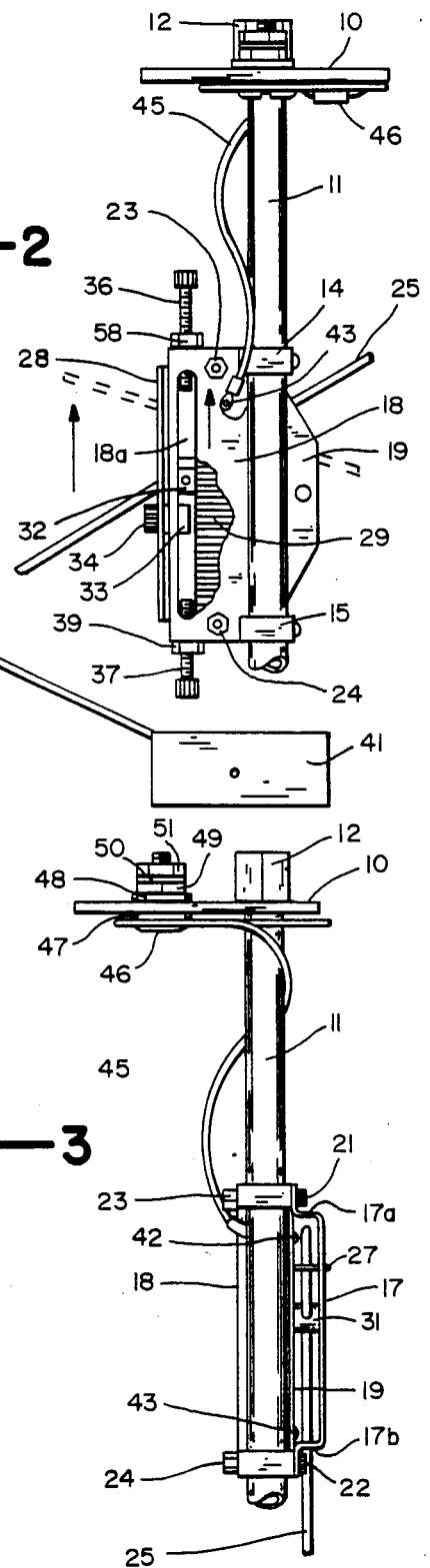
FIG.—1
FIG.—2
FIG.—3

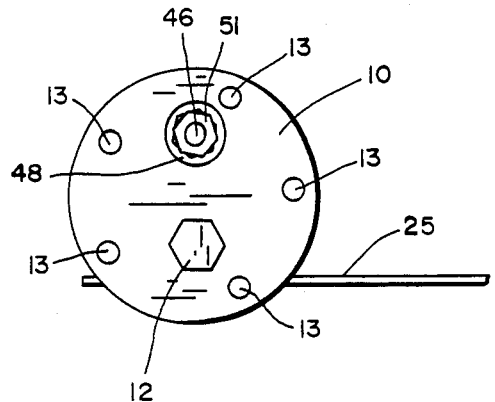
FIG.—4
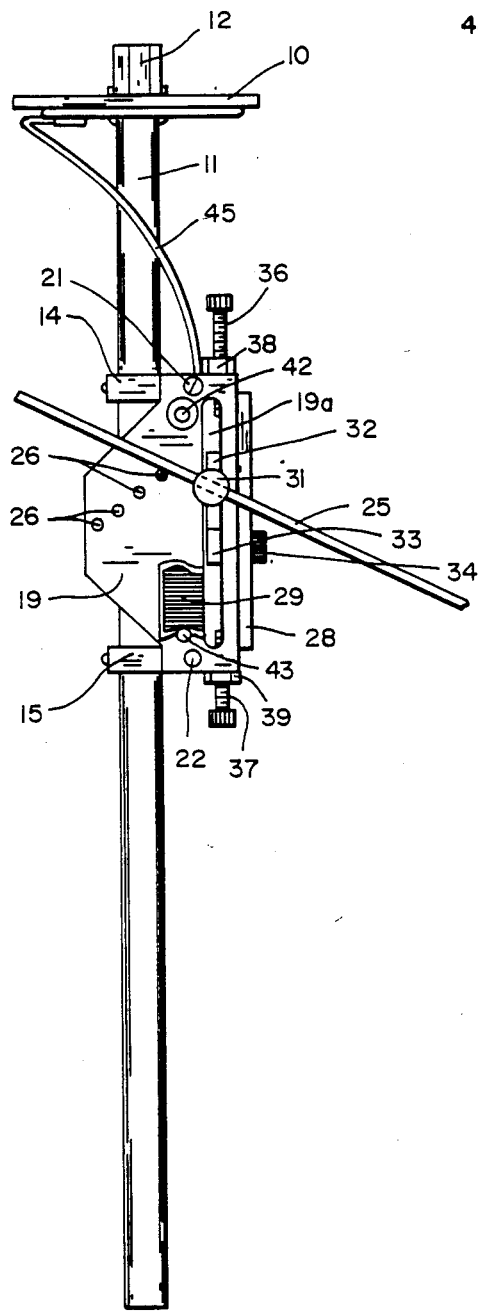
FIG.—5
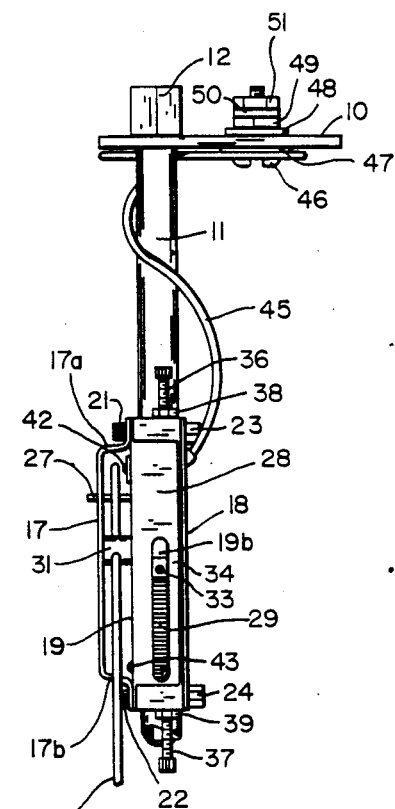
FIG.—6

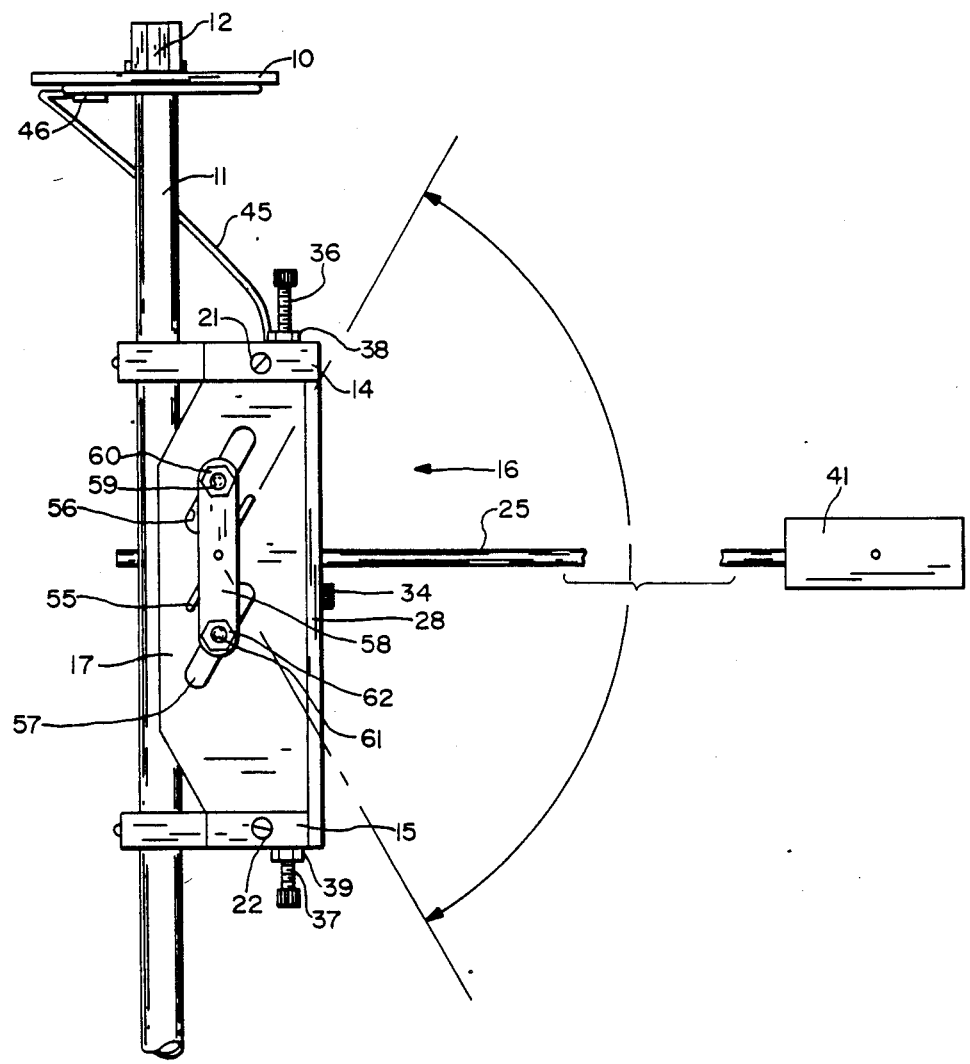
FIG.—7

LIQUID LEVEL INDICATING DEVICE

The present invention relates to a liquid level indicating device for a fuel tank. Specifically, the present invention relates to a sending unit for use in an automotive fuel tank which can be used universally on substantially all automotive fuel tanks independently of the size or shape of the particular tank.

Liquid level indicating devices are commonly used to indicate the depth or relative amount of liquid fuel in a fuel tank. Conventional indicating devices or sending units generally comprise a float, a float arm connected at one end to the float, and support means connected at the opposite end of the float arm to support both the float and the float arm rotatably inside the tank. Since the float rides near the surface of the liquid, a change of fuel depth in the tank causes the float arm to rotate through a limited angle about the support means.

Conventional sending means, operated by the tilting of the float arm, are calibrated for each fuel tank to indicate what percentage of maximum tank capacity the particular angle of tilt represents. The sending means generates an electrical signal proportionate to the fuel level in the tank and sends a signal to a suitable electric gauge or indicator mounted on the instrument panel of the vehicle. Generally, the sending means is a wire wound resistance element which is usually arc-shaped but can be striaght. The length of the resistance element will vary according to the depth of the particular automobile fuel tank thereby necessitating the use of a different rated gauge for each depth of tank or utilizing a voltage regulator in the guage circuit wherever a standard gauge is used with all depths of tanks. Most prior constructions of electrical resistance sending units maintain a constant ratio between ohm of resistance per inch of tank depth. A lengthening or shortening of the resistance element will affect the current range output of the indicator thereby requiring compensating means to obtain an accurate reading.

There are basically two known systems for corresponding the change in resistance to the liquid level of a fuel tank. In one type, the potentiometer's resistance to ground is reduced with the lowering of the fuel and the lowering of the float. This results in a decreasing voltage reading at the juncture of the gauge and potentiometer for decreasing fuel. In the other system, the lowering of the fuel level and the lowering of the float increases the potentiometer's resistance to ground resulting in an increasing voltage for decreasing fuel.

In conventional sending units, the float and float arm are fitted through an opening in the tank and supported inside the tank by bolting the cover plate of the support means to the tank over the opening. Conventionally, the hole pattern about the tank opening is irregular so that the cover plate can be secured in only one rotatable position relative to the tank. Since the support means is fixed to the cover plate, fixing the position of the cover plate locates the plane of tilt of the float and float arm. Also the length of the float arm and the maximum included angle of tilt determine the depth range of the particular sending unit. Generally, each sending unit is made to fit on a particular dimensioned fuel tank, and because of its fixed depth and plane of tilt relative to its flange cover plate, can only be used on a limited number of different fuel tanks. Consequently, it is difficult to maintain an inventory of sending units to cover the many sizes and types of fuel tanks commonly used.

There is a need for an indicating device or sending unit adaptable to substantially every autotmotive fuel tank independently of the size or shape of the tank and independently of the location of the tank opening or the relation of its hole pattern relative thereto.

It is an object of the present invention to provide a liquid level indicating device for an automobile fuel tank that will fit substantially every automobile fuel tank independently of the size or shape of the tank.

It is another object of the present invention, to provide a liquid level indicating device for a fuel tank with an adjustable resistance element adapted to correspond to the predetermined voltage range between empty and full readings on the automobile's fuel gauge and adapted to provide either decreasing voltage reading for lowering of fuel or increasing voltage reading for lowering of fuel to correspond to the predetermined electrical system of the existing fuel gauge.

In general, the present invention provides a liquid level indicating device for a fuel tank adaptable for use in any size fuel tank comprising a mounting plate, a support arm depending therefrom, a float arm, a float, a linear wire-wound resistor, a sliding contact member, means for varying the angle of tilt of the float arm, means for varying the distance of the arc through which the float sweeps relative to the support arm, and means for adjusting the effective resistance range of said resistor by controlling the length of travel of the sliding contact member along the linear wire-wound resistor.

Preferably, the present invention provides a liquid level indicating device for a fuel tank comprising: (a) a mounting plate adapted to be secured over the top opening of a fuel tank; (b) a support arm depending rigidly from said plate projecting toward the opposite end of said tank in a direction generally perpendicular to said plate; (c) a housing mounted on said support arm; (d) an elongated linear wire-wound resistor mounted within said housing such that its longitudinal axis is parallel to the longitudinal axis of said support arm, said resistor adapted to be connected in circuit with indicating means, to send signals indicating varying resistance values; (e) a pin; (f) means for positioning said pin at one of varying positions along said housing in a direction generally perpendicular to the longitudinal axis of said support arm; (g) a float arm mounted on said pin such that said float arm is pivotal between raised and lowered positions, the angle of tilt between the maximum raised position and the minimum lowered position of said float arm being adjustable by varying the position of said pin along said housing; (h) a float connected to said float arm, said float movable between raised and lowered positions in response to changes in the liquid level in said tank, said float sweeping through an arc, the distance of said arc from said support arm being adjustable by varying the position of said pin along said housing; (i) a sliding contact member mounted on said float arm, said sliding contact member movable along the length of said resistor in response to movement of said float arm such that said sliding contact member slides along said resistor in the direction of movement of said float arm to vary the effective resistance of said resistor; and (j) a stop pin adapted to be mounted in said housing at varying positions along the length of said resistor to select the angle of tilt between the maximum raised position and the minimum lowered position of said float arm, thereby defining the length of travel of said sliding contact along said resistor permitting adjustability of the resistance range from the maximum raised position to the minimum lowered position of said float arm.

Further objects and features of the present invention will appear from the following detailed description taken in conjuction with the accompanying drawings.

FIG. 1 is a front elevational view of a preferred embodiment of the liquid level indicating device of the present invention.

FIG. 2 is a rear elevational view of the liquid level indicating device shown in FIG. 1.

FIG. 3 is a left side elevational view of the liquid level indicating device shown in FIG. 1.

FIG. 4 is a top plan view of the liquid level indicating device shown in FIG. 1.

FIG. 5 is a front elevational view of the liquid level indicating device shown in FIG. 1 with plate 17 removed.

FIG. 6 is a right side elevational view of the liquid level indicating device shown in FIG. 1.

FIG. 7 is a rear elevational view of a second embodiment of the liquid level indicating device of the present invention.

Referring to FIG. 1, there is shown a front elevational view of a preferred embodiment of the liquid level indicating device of the present invention. The mounting plate 10 has a threaded hole near its center. The support arm 11 is threaded at one end and said threaded end is screwed into the threaded hole of mounting plate 10 where it is secured in place by securing means 12, preferably nut 12. The mounting plate 10 has a plurality of holes 13 (see FIG. 4) around its circumference. The hole pattern is designed so that the mounting plate 10 can be secured to the hole pattern in the top wall of the fuel tank of substantially all makes and models of automobiles. Different automobile makes and models have different hole patterns in the top wall of the fuel tank where the automotive sending unit or liquid level indicator is typically mounted. The mounting plate of the present invention has additional holes provided so that it can be mounted on the fuel tank of most makes and models of automobiles.

Two attachment bodies 14 and 15 are mounted on support member 11 in spaced apart relationship to each other to support the housing 16 which comprises three plates 17, 18, and 19. (See FIGS. 1, 2 and 5, respectively.) Plates 17 and 18 form the outer walls of the housing 16 and plate 19 forms an inner wall. All three plates are mounted at their upper and lower ends to attachment bodies 14 and 15 by securing means 21 and 22, prefereably bolts 21 and 22, and securing means 23 and 24, preferably nuts 23 and 24. Preferably, plate 17 is mounted to the attachment body by means of upper and lower flanges 17a and 17b in order to provide an open area through the housing in which the float arm 25 pivots. (See FIG. 3.)

Means for positioning a pin 27 at varying positions along the housing in a direction generally perpendicular to the longitudinal axis of the resistor 29 is provided in plates 17 and 19.

In one embodiment of the present invention shown in FIGS. 1 and 5, a plurality of holes 26 are provided in plate 17 with a plurality of corresponding opposing holes in plate 19 (not shown). A pin 27 is inserted through one of said holes in plate 17 and its corresponding hole in plate 19, and said float arm 25 is mounted on said pin. (See FIGS. 1 and 6.) Varying positions for the pivot point of the float arm are provided by inserting the pin in each different hole 26. By positioning the pin in each different hole 26, the angle of tilt between the maximum allowable raised position and the minimum allowable lowered position of the float arm can be adjusted and the distance of the arc through which the float sweeps in response to changes in the liquid level in the tank relative to the support arm can be adjusted. The diameter of pin 27 permits it to be securely positioned in the selected hole and corresponding opposing hole, but also allows for free rotation of pin 27 within the selected hole in response to movement of the float arm.

In another embodiment of the present invention shown in FIG. 7, slots 55, 56 and 57 are provided in plate 17 with corresponding opposing slots in plate 19 (not shown). Pin 27 can be positioned anywhere along slot 55 and the corresponding opposing slot in plate 19, and secured in the chosen position by fastening plate 58 to the housing at the corresponding positions in slots 56 and 57 by securing means. Preferably, the securing means consist of bolts 59 and 61 and nuts 60 and 62. The bolts 59 and 61 pass through slots 56 and 57 and their corresponding opposing slots on plate 19, respectively, and are secured into the desired position by nuts 60 and 62, respectively. Plate 58 has a hole 63 bored in the center thereof through which pin 27 passes. The diameter of hole 63 permits pin 27 to be secured in the selected position along slot 55, but also permits rotation of pin 27 in response to movement of the float arm 25.

Means for positioning pin 27 at varying positions along the housing can also be a single slot provided in plates 17 and 19 of the housing. The pin 27 can be threaded at both ends and nuts can be used to secure it at both ends in the desired position along the slot. An open ended cylinder sleeve can be positioned over pin 27 such that it rotates freely around pin 27. Float arm 25 can then be mounted on said sleeve to allow for pivotal movement of the float arm in response to liquid level changes.

Preferably, in the first embodiment shown in FIGS. 1 and 5, the plurality of holes 26 are bored through plates 17 and 19 such that a line connecting the holes forms an angle in the range of 15° to 45°, preferably 30°, in relation to the longitudinal axis of said support arm 11. Preferably, in the second embodiment shown in FIG. 7 and in the embodiment utilizing only one slot, the slots are bored through plates 17 and 19 such that the axis passing through each of said slots forms an angle in the range of 15° to 45°, preferably 30°, in relation to the longitudinal axis of said support arm 11.

Referring to FIG. 6, preferably plate 19 has a flange 28 depending therefrom at a right angle thereto in the direction away from plate 17 and towards plate 18 thereby providing an enclosed area between plates 18 and 19 within which the elongated linear wire-wound resistor 29 is mounted.

Slots 18a and 19a are provided in plates 18 and 19, respectively, in parallel alignment with each other. (See FIGS. 2 and 5.) Referring to FIGS. 3 and 6, float arm 25 passes through a hole bored in pivot member 31. Preferably, sliding contact member 32 is mounted on pivot member 31. Sliding contact member 32 is rectangular in shape and has two smaller rectangular projections on two opposing ends thereof. One projection is mounted to the pivot member 31. The two rectangular projections slide through opposing slots 18a and 19a in plates 18 and 19 serving to guide the contact member in a linear path along said resistor in response to movement of the float arm 25.

Referring to FIG. 6, slot 19b is provided in flange 28 of plate 19. A stop member 33 is secured into an adjustable position anywhere along the length of the slot 19b in flange 28 and is secured in the selected adjustable position by clamp screw 34. The stop member 33 can thus be positioned anywhere along the length of the slot 19b to limit the length of travel of the contact member along the length of the resistor 29. (See also FIG. 2.) This in turn permits adjustability of the resistance range of the liquid level indicator thereby making the liquid level indicator of the present invention adaptable to any automotive fuel gauge regardless of its predetermined resistance range between empty and full tank readings.

Referring to FIG. 2, adjustable upper and lower limit stops 26 and 37 are provided above and below the line of travel of said sliding contact member 32. Preferably, the stops 36 and 37 are screws which can be screwed into threaded holes in attachment bodies 14 and 15 directly above and below the line of travel of said sliding contact member 32. Preferably, the screws 36 and 37 are secured in a given position by nuts 38 and 39. Screws 36 and 37 can then be screwed into the chamber through which the sliding contact member travels to further limit the travel of the sliding contact member 32 along the resistor 29. As shown in FIG. 2, screw 36 limits the upward travel of contact member 32 and stop member 33 provides the lower limit to the travel of contact member 32. The stop member 33 can be removed thereby permitting screw 37 to provide an even lower limit to the travel of contact member 32.

A float 41 is attached to float arm 25 at the end opposite the mounted end of float arm 25.

Referring to FIG. 5, resistor 29 is secured to plate 19 by securing means 42 and 43, preferably a rivet and nut arrangement. Conductor means 45 is secured to said resistor by said securing means 42 and 43. (See FIG. 2.) A conductive metal sheet is positioned on said resistor between said conductor means 45 and said resistor 29, and is also held in place by securing means 42 and 43. Conductor means 45 is then secured on the underside of said mounting plate 10 by securing means 46, preferably a bolt. Securing means 46 passes through a hole bored in mounting plate 10. Referring to FIG. 6, preferably, insulating washer 47 is placed between the mounting plate and the connection point of said conductor means to said securing means 46, and a second insulating washer 48, nut 49, washer 50 and nut 51 are screwed onto securing means 46 on the top end of the mounting plate to hold the conductor means 45 tightly in place. The liquid level indicating device of the present invention is then adaptable to be connected to the electrical system leading to the fuel gauge of the automobile by unscrewing nut 51, removing washer 50, attaching wiring or conductor means leading to said electrical system, and securing said wiring or conductor means in place with washer 50 and nut 51.

The liquid level indicating device of the present invention provides a truly universal sending unit which can be adapted to fit substantially all automobile fuel tanks regardless of their dimensions and can be adapted to correspond to the predetermined resistance range for empty and full readings in the electrical system leading to the fuel gauge of the automobile.

Specifically, the sending unit of the present invention can be mounted on the top wall of the fuel tank of virtually all makes and models of automobile due to the universal hole pattern provided in the mounting plate 10. The total distance of the arc through which the float 41 may sweep in relation to the support arm 11 can be varied by mounting pin 27 in each of the various holes 26 or by mounting pin 27 in varying positions along a slot, thereby making the sending unit of the present invention adaptable to fuel tanks of varying dimensions. Positioning the pin 27 in various positions also varies the angle of tilt of the float arm from a desired maximum raised position to a desired minimum lowered position when stop pin 34 and upper limit stop 36 or upper and lower limit stops 36 and 37 are in a given position. The angle of tilt can also be varied by varying the position of stop pin 33 along the length of resistor 29 and by varying the position of upper limit stop 36. The adjustability of the angle of tilt of the float arm permits use of the sending unit of the present invention on fuel tanks of various depths.

The length of the float arm 25 from the pivot point (pin 27) to the float can also be varied by sliding the float arm through pivot member 31 in a direction towards the support arm to shorten the float arm or in a direction away from the support arm to lengthen the float arm prior to mounting it on pin 17.

Controlling the angle of tilt of the float arm also makes the sending unit of the present invention adaptable to any automobile's electrical fuel gauge system because the angle of tilt corresponds to the length of travel of the sliding contact member 32 on the resistor 29, i.e., the range of resistance between the raised and lowered positions of the float arm. A preferred embodiment of the present invention provides a resistor 29 with a resistance range from 0 to 500 ohms. One automobile may have an electrical fuel gauge system calibrated to indicate a full reading at 200 ohms and an empty reading at 0 ohms and another automobile may have an electrical fuel gauge system calibrated to indicate a full reading at 100 ohms and an empty reading at 0 ohms. The liquid level indicating device of the present invention can be used in either automobile by positioning stop pin 33 just below the 100 or 200 ohm position on the resistor thereby permitting the sliding contact member 32 to slide from the 0 ohm position to the 100 or 200 ohm position on the resistor in response to movement of the float arm from the maximum raised position (full) to the minimum lowered position (empty). The preferred embodiment of the liquid level indicating device of the present invention can be used in any automobile with a resistance range of up to 500 ohms by positioning stop pin 33 or upper and lower limit stops 36 and 37 at the desired position along the resistor.

The liquid level indicating device of the present invention is also adaptable to be used in an automobile with an electrical fuel gauge system calibrated to indicate a full reading at 0 ohms and an empty reading at 100, 200, or up to 500 ohms. To adapt the present invention to such calibration, the resistor 29 can be removed from the housing turned upside down and reinserted into the housing so that the maximum raised position of the float arm positions the sliding contact member 32 at the lower end of the resistor where the 0 ohm resistance reading is obtained. As the fuel level decreases the float arm 25 moves downward in response to the float 41 causing the sliding contact member 32 to move down the length of the resistor to the 100 or 200 or 500 ohm position depending on where the stop pin 33 is set to indicate an empty tank.

The liquid level indicating device of the present invention can also be adapted for use in an automobile which is calibrated to show a full reading at 0 ohms and an empty reading at 100, 200 or up to 500 ohms by reversing the direction the float arm projects from the support arm. Specifically, float arm 25 is pulled through the hole in pivot member 31 so that the majority of the length of float arm 25 projects in the opposite direction and then mounted to the pin 27. The float arm now pivots in the opposite direction. The float 41 is then mounted on the float arm at the opposite end. By this adjustment, it is no longer necessary to reverse the position of the resistor in order to obtain a reverse in the resistance values for the full and empty positions.

The present invention provides significant advantages over all prior art sending units because none of the prior art sending units allow adjustability of the length of the float arm and the attendant location of the arc through which the float sweeps, together with adjustability of the angle of tilt of the float arm, adjustability of the resistance range from empty to full, and adjustability between increasing resistance for lowering fuel levels and decreasing resistance for lowering fuel levels.

The liquid level indicating device of the present invention is calibrated by attaching it to the electrical system of a vehicle, and turning on the ignition to energize the fuel tank gauge. The float arm 25 is positioned at its maximum height in the fuel tank and the upper limit screw is adjusted so that the gauge reads full at the maximum height. The float arm 25 is then positioned at its minimum height in the fuel tank and the stop pin 33 is positioned so that at the minimum height the fuel gauge reads empty. If the resistance range is greater than 250 ohms, the stop pin should be removed from the device and the lower limit screw adjusted so that at the minimum height the gauge reads empty.

To finish the calibration, the float arm length is adjusted by pulling it through the hole in the pivot member 31 and, if desired, cutting off the excess, so that the difference in height between the maximum and minimum positions of the float arm is the height of the fuel tank less the width of the float. The float is then installed on the float arm and the unit is ready for final installation in the fuel tank.

While a preferred embodiment of the invention has been illustrated and described in detail, it is to be understood that various changes may be made in the disclosed embodiment without departing from the scope or spirit of the invention.

What is claimed is:

1. A liquid level indicating device for a fuel tank comprising:
   (a) a mounting plate adapted to be secured over a top opening of said tank;
   (b) a support arm depending rigidly from said plate projecting toward an opposite end of said tank in a direction generally perpendicular to said plate;
   (c) an elongated linear wire-wound resistor mounted on said support arm such that its longitudinal axis is parallel to the longitudinal axis of said support arm, said resistor adapted to be connected in circuit with indicating means to send signals indicating varying resistance values;
   (d) a float arm pivotally mounted on said support arm such that said float arm is pivotal between maximum raised and minimum lowered positions and thereby defining an angle of tilt therebetween;
   (e) a float connected to said float arm, said float movable between raised and lowered positions in response to changes in the liquid level in said tank, said float sweeping through an arc;
   (f) a sliding contact member mounted on said float arm, said sliding contact member movable along a length of said resistor in response to movement of said float arm such that said sliding contact member slides along said resistor in the direction of movement of said float arm to vary the effective resistance of said resistor;
   (g) means for varying the angle of tilt between a maximum allowable raised position and a minimum allowable lowered position of said float arm and for varying the total distance of said arc through which said float is capable of sweeping relative to said support arm; and
   (h) means for selecting a desired angle of tilt between the maximum raised position and the minimum lowered position of said float arm so as to set a desired maximum raised position and minimum lowered position and thereby adjusting the effective resistance range of said resistor throughout its entire range by controlling the length of travel of said sliding contact member along said resistor.

2. A liquid level indicating device for a fuel tank comprising:
   (a) a mounting plate adapted to be secured over a top opening of said tank;
   (b) a support arm depending rigidly from said plate projecting toward an opposite end of said tank in a direction generally perpendicular to said plate;
   (c) a housing mounted on said support arm;
   (d) an elongated linear wire-wound resistor mounted within said housing such that its longitudinal axis is parallel to the longitudinal axis of said support arm, said resistor adapted to be connected in circuit with indicating means to send signals indicating varying resistance values;
   (e) a pin;
   (f) means for positioning said pin at one of varying positions along said housing in a direction generally perpendicular to the longitudinal axis of said support arm;
   (g) a float arm mounted on said pin such that said float arm is pivotal between maximum raised and minimum lowered positions, the angle of tilt between the maximum allowable raised position and the minimum allowable lowered position of said float arm being adjustable by varying the position of said pin along said housing;
   (h) a float connected to said float arm, said float movable between raised and lowered positions in response to changes in the liquid level in said tank, said float sweeping through an arc, the total distance of said arc from said support arm being adjustable by varying the position of said pin along said housing;
   (i) a sliding contact member mounted on said float arm, said sliding contact member movable along a length of said resistor in response to movement of said float arm such that said sliding contact member slides along said resistor in the direction of movement of said float arm to vary the effective resistance of said resistor; and
   (j) a stop pin adapted to be mounted in said housing at varying positions along the length of said resistor to select a desired angle of tilt between the maximum raised position and a desired minimum lowered position of said float arm, thereby defining a length of travel of said sliding contact member along said resistor permitting adjustability of a resistance range from the maximum raised position to the minimum lowered position of said float arm.

3. A liquid level indicating device according to claim 2, further comprising an upper limit stop and a lower limit stop positioned at upper and lower ends of a passageway through which said sliding contact member travels as it slides along said resistor, said upper limit stop limiting the upward travel of said sliding contact member, said stop pin limiting the lower limit of travel of said sliding contact member, said stop pin being removable to permit a wider range of lower end travel of said sliding contact member, said lower limit stop being adjustable to limit said lower end travel of said sliding contact member when said stop pin has been removed.

4. A liquid level indicating device according to claim 2, wherein a direction of projection from said housing of said float arm is reversible thereby providing a liquid level indicating device wherein increasing resistance indicates decreasing fuel level when said float arm is in one position and wherein decreasing resistance indicates decreasing fuel level when said float arm is in a reversed position.

5. A liquid level indicating device according to claim 2, wherein said means for positioning said pin at varying positions along said housing comprises a plurality of holes provided in said housing, each hole bored through an outer wall and an inner wall of said housing in a direction generally perpendicular to the longitudinal axis of said support arm, said holes disposed in linear relationship to each other.

6. A liquid level indicating device according to claim 2, wherein said means for positioning said pin at varying positions along said housing comprises a slot provided in said housing, said slot bored through an outer wall and an inner wall of said housing in a direction generally perpendicular to the longitudinal axis of said support arm, and means for securing said pin in a selected position along said slot.

7. A liquid level indicating device according to claim 5, wherein said holes are disposed in linear relationship to each other such that the axis connecting said plurality of holes forms an angle in the range of about 15° to 45° in relation to the longitudinal axis of said support arm.

8. A liquid level indicating device according to claim 6, wherein the axis passing through said slot forms an angle in the range of about 15° to 45° in relation to the longitudinal axis of said support arm.

9. A liquid level indicating device according to claim 7, wherein said axis forms an angle of about 30° in relation to the longitudinal axis of said support arm.

10. A liquid level indicating device according to claim 8, wherein said axis forms an angle of about 30° in relation to the longitudinal axis of said support arm.

11. A liquid level indicating device according to claim 2, wherein said resistor is mounted within said housing by means permitting removal and replacement of said resistor in a reversed position such that said sliding contact member slides along said resistor in response to movement of said float arm, whereby in one position of said resistor, increasing resistance indicates decreasing fuel level, and in a reversed position of said resistor, decreasing resistance indicates decreasing fuel level.

* * * * *